United States Patent [19]
Yamano

[11] Patent Number: 4,677,306
[45] Date of Patent: Jun. 30, 1987

[54] DRIVE APPARATUS FOR SOLID-STATE IMAGE PICKUP DEVICE

[75] Inventor: Shozo Yamano, Tokyo, Japan
[73] Assignee: Nippon Kogaku K. K., Tokyo, Japan
[21] Appl. No.: 702,592
[22] Filed: Feb. 19, 1985
[30] Foreign Application Priority Data
 Feb. 21, 1984 [JP] Japan .................. 59-31142
[51] Int. Cl.⁴ .......................... H04N 3/12; H04N 3/14
[52] U.S. Cl. .................. 250/578; 358/212; 358/213.26; 358/213.29; 250/209
[58] Field of Search .............. 250/578, 209, 201 AF; 358/213, 212

[56] References Cited
U.S. PATENT DOCUMENTS

| | | | |
|---|---|---|---|
| 4,315,159 | 2/1982 | Niwa et al. | 250/578 |
| 4,360,833 | 11/1982 | Kinoshita et al. | 358/213 |
| 4,369,469 | 1/1983 | Endo et al. | 358/213 |
| 4,472,744 | 9/1984 | Inoue et al. | 358/213 |
| 4,528,595 | 7/1985 | Eouzan | 358/213 |
| 4,529,886 | 7/1985 | Yokoyama et al. | 250/578 |

Primary Examiner—Edward P. Westin
Assistant Examiner—Charles Wieland
Attorney, Agent, or Firm—Shapiro and Shapiro

[57] ABSTRACT

A drive apparatus for a solid-state image pickup device, in which an average output level of the charge storage portion can be maintained substantially constant even if a storage time interval is short in the case of high luminance, and in which a signal charge in the shift register can be properly transferred, is so constructed that a drive pulse is supplied to the transfer portion so that the transfer portion receives a charge from a photosensor for a predetermined period of time simultaneously when the charge stored in the photosensor is shifted to the transfer portion.

12 Claims, 9 Drawing Figures

DRIVE APPARATUS FOR SOLID-STATE IMAGE PICKUP DEVICE

BACKGROUND OF THE INVENTION

1. Field of the Invention

The present invention relates to a drive apparatus for a solid-state image pickup device.

2. Description of the Prior Art

Solid-state image pickup devices have been used in a variety of applications such as an image sensor in a facsimile system or the like. The output characteristics of the image sensor linearly change in accordance with changes in light intensity at a photosensor constituted by photodiodes or the like. For example, when a solid-state image pickup device is used for detecting a focusing state in a camera, such a device must cover a wide sensitivity range from a low luminance of an object to be photographed to a high luminance thereof. For this reason, the storage time interval of a charge to be photoelectrically converted must be controlled to cover a wide dynamic range. Even if the luminance of the object changes, the output level of the charge must be kept substantially constant. Thereafter, signal processing for focus detection is generally performed. Furthermore, in a solid-state image pickup device of this type, in order to equalize noise components caused by a dark current and a low transfer efficiency and eliminate the influence of noise components, a shift register is preferably subjected to continuous transfer operation. For operation in such a manner, detection is performed to ascertain whether an average value of signal charges stored in the photosensor has reached a reference level. The stored charges must be stored in the shift register. However, the storage timing of the charges in the shift register depends upon the amount of light received by the image sensor. The storage timing is independent of the transfer clocks of the shift register. If storage is required, the clock level of the transfer clock is not always set in the charge storage enable state, so that charge storage cannot be performed in this state. In a conventional drive apparatus for a solid-state image pickup device, timing of a storage pulse (to be referred to as a shift pulse) must be matched with that of a transfer clock of the shift register. As described above, when the image pickup device is used for detecting a focusing state of the object, if an object has a high luminance, the proper charge storage time interval is shortened in the image sensor. When the period of the transfer clock is substantially equal to the charge storage time interval of the shift register, a proportion of a time difference between the actual charge storage time interval upon matching between the shift pulse and the transfer clock and the proper charge storage time interval is increased with respect to the proper charge storage time interval. An error caused by the time difference cannot be disregarded.

SUMMARY OF THE INVENTION

It is an object of the present invention to provide a drive apparatus for a solid-state image pickup device, wherein an average output level of the charge storage portion can be maintained substantially constant even if a storage time interval is short in the case of high luminance, and wherein a signal charge in the shift register can be properly transferred.

In order to achieve the above object of the present invention, a drive pulse is supplied to the transfer portion so that the transfer portion receives a charge from a photosensor for a predetermined period of time simultaneously when the charge stored in the photosensor is shifted to the transfer portion.

DETAILED DESCRIPTION OF THE PREFERRED EMBODIMENTS

The principle of the present invention will be described in detail with reference to FIGS. 1 to 4.

Figure 1:
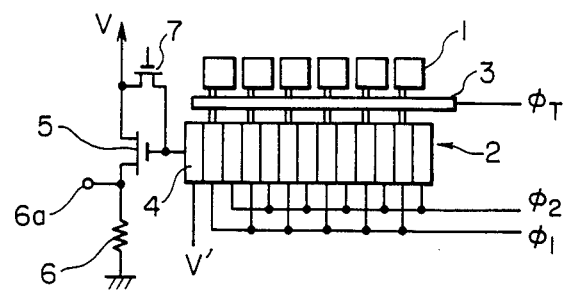
FIG. 1 is a block diagram for explaining the principle of the present invention.

FIG. 1 is a diagram showing a typical one-dimensional solid-state image pickup device using a two-phase drive CCD (charge-coupled device). A storage portion 1 of a photosensor stores a signal charge obtained by photoelectrically converting an optical signal. An analog shift register 2 comprises a CCD which receives the signal charge from the storage portion 1 and sequentially transfers the output to an output amplifier constituted by components 4, 5, 6 and 7 (to be described later) in response to clock pulses $\phi 1$ and $\phi 2$. A shift gate 3 shifts the stored charge of the storage portion 1 to the analog shift register 2 in response to a shift pulse $\phi T$. The output amplifier comprises an output gate 4, an output transistor 5, a load resistor 6 and a reset transistor 7. The solid-state image pickup device having the arrangement described above is operated as follows. When the shift pulse $\phi T$ is applied to the shift gate 3, the shift gate 3 is enabled to instantaneously shift the signal charge from the storage portion 1 to the analog shift register 2. The signal charge is then transferred to the output gate 4 in response to the transfer clock pulses $\phi 1$ and $\phi 2$. Output signals corresponding to stored charges of the respective portions of the register 2 are sequentially generated from an output terminal 6a. When the signal charge is not shifted from the storage portion 1 to the shift register 2 while the transfer clock pulses $\phi 1$ and $\phi 2$ are set in an enable state for shifting the signal charge from the storage portion 1 to the analog shift register 2, i.e., while conditions $\phi 1 = H$ and $\phi 2 = L$ (where H is high level and L is low level) are established, accurate charges cannot be properly shifted to the respective stages of the shift register 2.

Figure 2:
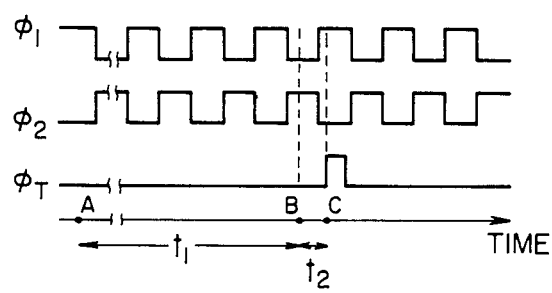
FIGS. 2, 3 and 4 are respectively timing charts for explaining the operation of the principle of the present invention.
Figure 3:
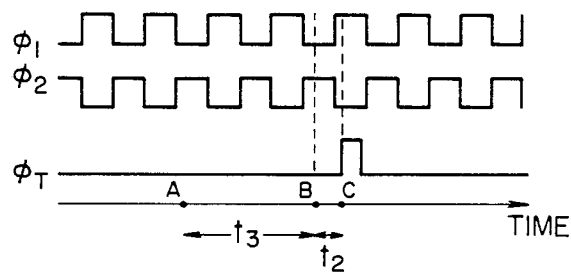

FIGS. 2 and 3 are timing charts of the pulses $\phi 1$, $\phi 2$ and $\phi T$ shown in FIG. 1. The pulses $\phi 1$ and $\phi 2$ have opposing phases. When signal charge storage is started in the storage portion 1 at time A of FIG. 2 and an average value of the charges stored by the storage portion 1 of FIG. 1 is detected by a stored charge detector (not shown) to have reached a reference level at time B, the pulse $\phi 1$ is set at L level at time B. The shift pulse $\phi T$ is supplied to the shift gate 3 of FIG. 1 at time C that lags time B by a time interval t2 B since the pulse φ1 goes high at time C. In this case, the sum of the time interval t1 between time A as the storage start time and time B for causing the average value to reach the reference level and the time interval t2 is defined as the actual storage time interval of the storage portion 1. When the time interval t1 is very much longer than the time interval t2, a change in output level as a function of the storage time interval is small. However, when a high-luminance object is to be photographed, as shown in FIG. 3, the time interval t3 between time A and time B for causing the average value to reach the reference level becomes short. The actual storage time interval (t3+t2) as the sum of the time interval t3 and a lag time interval t2 is very much longer than the inherent storage time interval, thereby greatly changing the output level.

Figure 4:
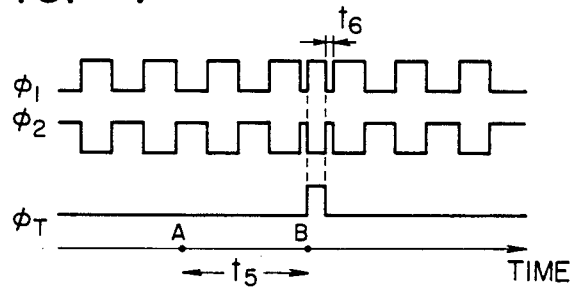

FIG. 4 shows a case wherein the shift pulse φT is generated at time B when the average value reaches the reference level after a storage time interval t5 has elapsed. The transfer clock φ1 is forcibly set at a charge reception enable state (H level) for a predetermined period of time at time B. According to this method, although the charge shift from the storage portion 1 (FIG. 1) to the analog shift register 2 (FIG. 1) can be properly performed, the operation precision during the time interval t5 depends on the amount of light received. During this period of time, the shift pulse φT is asynchronous with the clock pulses φ1 and φ2. In the example shown in FIG. 4, a time interval required for setting the transfer clock in the same phase as in the charge reception enable state from the trailing edge of the shift pulse, i.e., a time interval for establishing conditions φ1=H and φ2=L becomes very short (i.e., t6≈0). When this occurs, a clock pulse width t6 of the transfer clock for φ1=L and φ2=H is extremely short. The proper subsequent charge transfer in the analog shift register cannot be expected. The signal charges of the transfer stages of the shift register which are received through the shift gate 3 often may not correspond to the charges stored by the storage portion 1.

Figure 5:
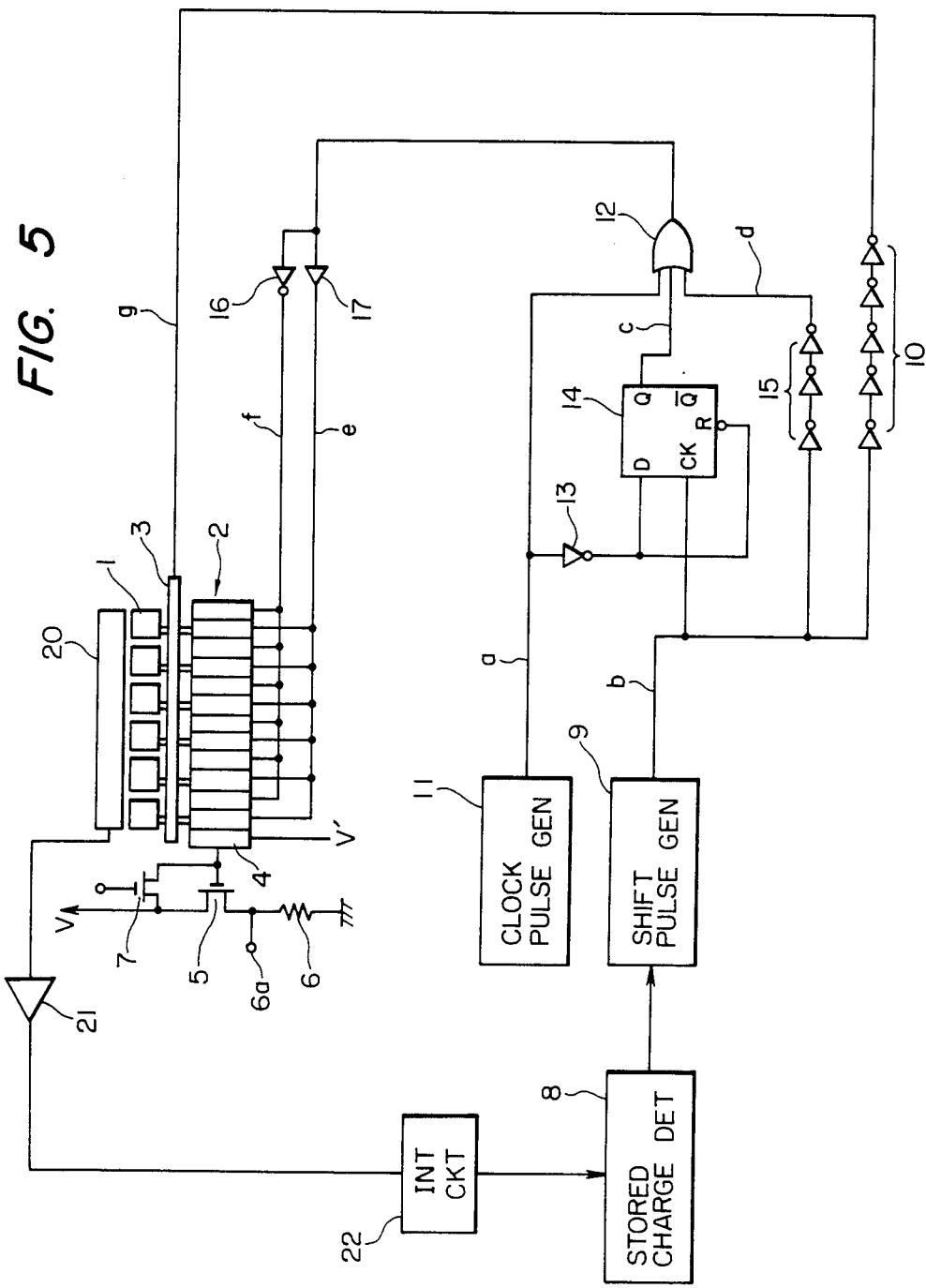
FIG. 5 is a block diagram of a drive apparatus for a solid-state image pickup device according to an embodiment of the present invention.

FIG. 5 is a block diagram of a drive apparatus for a solid-state image pickup device according to an embodiment of the present invention. The parts designated by reference numerals 1 to 7 in FIG. 5 are the same as those in FIG. 1. An integrator circuit 22 integrates an output derived through an amplifier 21 from a photodiode 20 which is arranged near a storage portion 1. An integrated output is supplied to a stored charge detector 8. The stored charge detector 8 generates an output signal when the output from the integrator circuit 22 reaches a reference level. The output signal from the stored charge detector 8 is supplied to a shift pulse generator 9. The shift pulse generator 9 generates a pulse having a predetermined pulse width. An inverter network 10 supplies the output from the shift pulse generator 9 to a shift gate 3. A clock pulse generator 11 supplies a pulse to the first input terminal of an OR gate 12 and to an inverter 13. A D flip-flop 14 receives an output from the inverter 13 at an input terminal D and a reset terminal R. A clock input terminal CK of the D flip-flop 14 receives the output from the shift pulse generator 9. A signal supplied to the input terminal D of the D flip-flop 14 appears at an output terminal Q thereof at the leading edge of the pulse supplied to the clock input terminal CK. Thereafter, this output state is kept unchanged. However, when a reset input (a signal of L level) is supplied to the reset terminal R, the output at the output terminal Q is reset irrespective of the inputs to the input terminals D and CK, so that the output at the output terminal Q goes low. The output terminal Q is connected to the second input terminal of the OR gate 12. The third input terminal of the OR gate 12 is connected to the output terminal of an inverter network 15 which receives the output from the shift pulse generator 9. An inverter 16 and a buffer 17 commonly receive the output from the OR gate 12. The inverted signal from the inverter 16 and the non-inverted signal from the buffer 17 are supplied to the gates of the shift register 2 in order to transfer the signal charges.

Figure 6:
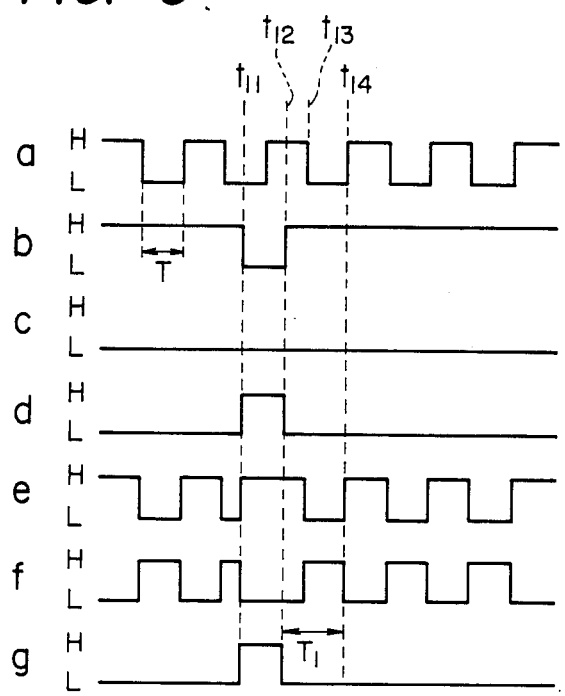
FIGS. 6 and 7 are block diagrams of the drive apparatus shown in FIG. 5.
Figure 7:
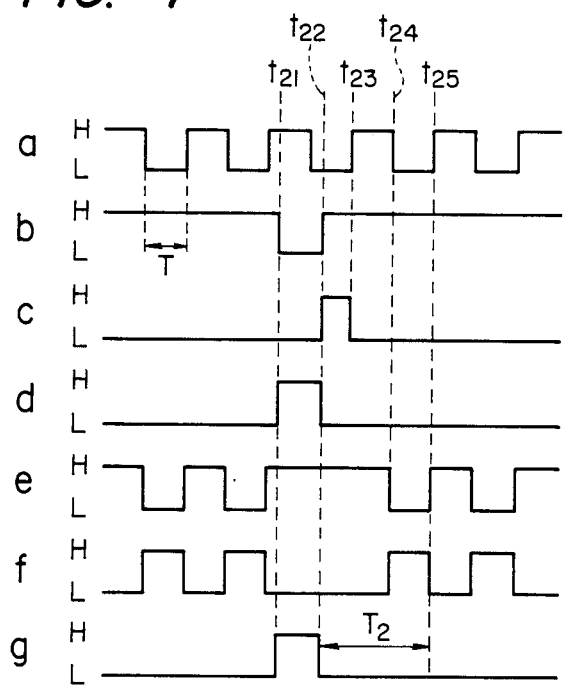

The operation of the drive apparatus having the above arrangement will be described hereinafter. FIGS. 6 and 7 are respectively timing charts of the respective components of the apparatus of FIG. 5. The operation will be first described with reference to FIG. 6.

When the stored charge detector 8 detects that the charge stored by the charge storage portion 1 has reached the reference level, the stored charge detector 8 generates a signal to the shift pulse generator 9. The shift pulse generator 9 supplies a shift pulse b of FIG. 6 at time t11. Upon generation of the shift pulse, an output e from the buffer 17 goes high through the OR gate 12 irrespective of the logic level of the clock pulse a. At the same time, an output f from the inverter 16 goes low. The inverter networks 15 and 10 comprise multi-stage gate circuits in reference to the delay time, but can be regarded as single inverters when their operations are considered. The output b from the shift pulse generator 9 causes the inverter 10 to supply a shift pulse g to the shift gate 3. The respective gates of the analog shift register 2 are set in a charge reception enable state (e=H and f=L) through the inverter network 15, the OR gate 12, the buffer 17 and the inverter 16. Upon application of the shift pulse g, the charge is shifted from the storage portion 1 to the analog shift register 2. Since the clock pulse a is set at H level at the trailing edge (time t12) of the shift pulse, the D input to the D flip-flop 14 is set at L level, and the Q output C therefrom is kept at L level upon rising of the output b from the shift pulse generator 9. However, since the clock a is set at H level, the signals e and f of H and L levels, respectively, are supplied to the gates of the analog shift register 2 through the OR gate 12, the buffer 17 and the inverter 16. Even if the output b from the shift pulse generator 9 is set at H level (i.e., the shift end state), the signal e of H level and the signal f of L level are supplied to the gates of the analog shift register 2 in response to the clock pulse a. When the clock pulse is set at L level at time t13 in response to the clock pulse a, signal charge transfer in the shift register 2 is started in response to the transfer clock pulses e and f on the basis of the clock pulse a having a period 2T. In this case, the transfer clocks e and f are set at the same levels as in the charge reception enable state at the shift pulse end (t12). After the shift is ended at time t12, a predetermined period T1 of time can be provided until the next charge reception enable state, (e=H and f=L) thereby performing the proper signal charge transfer. It should be noted that the period T1 is longer than a predetermined normal transfer period of time T.

Another case will be described with reference to FIG. 7. When the stored charge detector 8 detects that the charge stored by the storage portion has reached the reference level in the same manner as described above, the stored charge detector 8 supplies a signal to the shift pulse generator 9, and the generator 9 generates a pulse b of FIG. 7. As described with reference to FIG. 6, the transfer clocks (e=H and f=L) in the charge reception enable state are supplied to the gates of the analog shift register 2 through the inverter network 15, the OR gate 12, the inverter 16 and the buffer 17 while the pulse b is being generated (t21 to t22). At the same time, the shift pulse g is supplied to the gate 3 through the inverter network 10. Thereafter, the storage charge is shifted from the storage portion 1 to the register 2. Since the clock pulse a is set at L level at the trailing edge of the pulse b, i.e., at the shift end time t22, the D input to the flip-flop 14 is set at H level, and the Q output C therefrom is set at H level. The output from the OR gate 12 is kept at H level even if the output d from the inverter network 15 is set at L level at the trailing edge of the pulse b. In this case, by the delay operation of the inverter network 15, the output d from the inverter network 15 is set at L level after the Q output C from the D flip-flop 14 is set at H level. Therefore, the output from the OR gate 12 will not be instantaneously set at L level. The Q output C from the flip-flop 14 is held until the clock a goes high (t23). Thereafter, the transfer clocks e and f of FIG. 7 in response to the clock a are supplied to the gates of the register 2 to transfer the signal charge. In this case, the transfer clocks e and f are kept in the charge reception enable state (e=H and f=L) after the shift pulse end time t22. Therefore, the time interval T2 until the next charge reception enable state can be longer than the predetermined normal transfer period of time T, thereby performing proper transfer operation.

As is apparent from FIGS. 6 and 7, even if the output b is generated from the shift pulse generator 9 irrespective of the timing of the clock pulse a, the clocks e and f are kept in the charge reception enable state (e=H and f=L) in response to the shift pulse g. In addition, a time interval for which the transfer clocks are initiated (t14 and t25) in the next charge reception enable state after the trailing edge (t12 or t22) of the shift pulse g can be longer than the predetermined normal transfer period of time.

Figure 8:
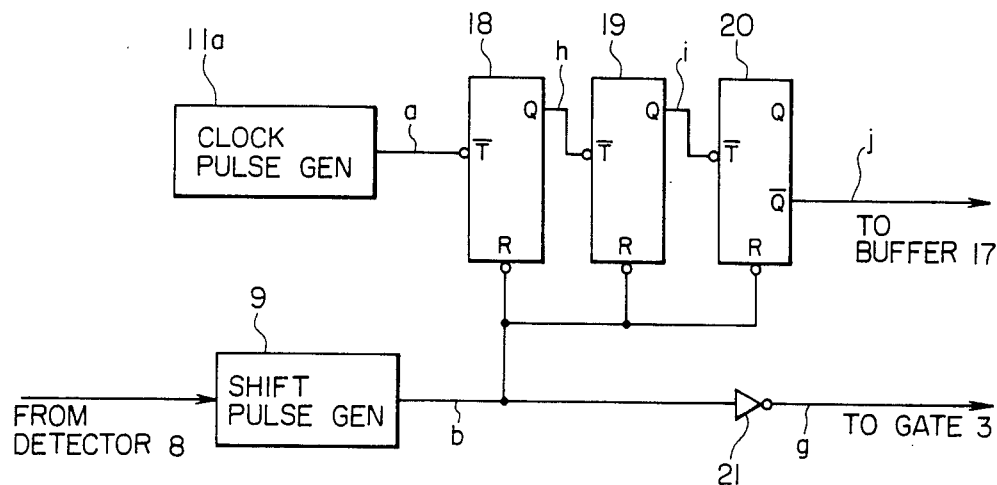
FIG. 8 is a block diagram of a drive apparatus for a solid-state image pickup device according to another embodiment of the present invention.
Figure 9:
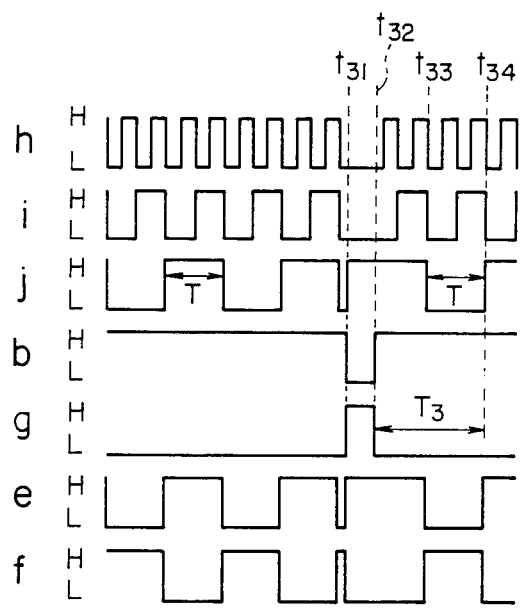
FIG. 9 is a timing chart for explaining the operation of the apparatus of FIG. 8.

FIG. 8 shows another embodiment of the present invention. Generators 9 and 11a have the same arrangement as those of the generators 9 and 11 in FIG. 5, as designated by the same or similar reference numerals, except that the generator 11a generates a clock pulse having a frequency different from that of the generator 11. The drive apparatus of this embodiment further comprises T flip-flops 18, 19 and 20 whose outputs are inverted upon rising of the T inputs, and an inverter 21. Reference symbols h to f in FIG. 9 show the waveforms of the pulses generated at the respective components of FIG. 8. In this case, when a stored charge detector 8 detects that the charge stored by a storage portion 1 has reached a reference level, the detector 8 supplies a shift pulse b to a shift pulse generator 9 at time t31 of FIG. 9. Upon generation of the shift pulse b, the T flip-flops 18 to 20 are reset, and an output e from the buffer 17 is set at H level irrespective of the previous state of the shift pulse. An output f from the inverter 16 is set at L level. The shift gate 3 receives the shift pulse g through the inverter 21. As previously described, the respective gates of the register 2 are set in the charge reception enable state (e=H and f=L), so that the charge is transferred from the storage portion 1 to the register 2 upon application of the shift pulse g. The reset states of the T flip-flops 18 to 20 are released at the trailing edge (t32) of the shift pulse. An output j from the T flip-flop 20 is not immediately inverted, but inverted at the second trailing edge of the output h from the T flip-flop 18. Thereafter, the charge is transferred in the register 2 in response to transfer clock pulses e and f based on the clock pulse j having the period 2T. In this case, the pulses e and f are set by the flip-flops 18 and 19 at the same level as in time t32 to t31 for the period longer than the period T/2 from the trailing edge of the shift pulse g. Therefore, the time interval T3 for initiating the next charge reception enable state (e=H and f=L) can be longer than the predetermined normal transfer period of time T.

As is apparent from the description with reference to FIG. 8, even if the output b is generated from the shift pulse generator 9 irrespective of the timing of the transfer clock pulse j, the clock pulses e and f can be set in the charge reception enable state (e=H and f=L) in response to the shift pulse g. The time interval (T3) for causing the transfer clocks to have the same phases as in the next charge reception enable state can be longer than the predetermined normal transfer period of time T.

In the above embodiments, the time interval T1, T2 or T3 required for causing the transfer clock pulses e and f to have the same phases (at time t14, t25 or t34) as in the charge reception enable state from the trailing edge (at time t12, t22 or t32) of the shift pulse g is longer than the half period T (i.e., a time interval between times t13 and t14, between times t24 and t25 or between times t33 and t34).

It is essential that the time interval T1, T2 or T3 be longer than at least the predetermined period of time required for accurate charge transfer.

What is claimed is:

1. An apparatus for use in an auto-focus system of a camera, for generating a signal corresponding to a light intensity distribution, comprising:
    (a) photoelectric transducer means having a plurality of elements which respectively generate charges corresponding to light intensities;
    (b) transfer means for time-serially transferring the charges to an output of said apparatus;
    (c) shift means for shifting the charges from said plurality of elements to said transfer means;
    (d) driving means for driving said transfer means, said driving means being adapted to supply a drive signal to said transfer means so as to drive said transfer means, said drive signal having a first level and a second level different from said first level and being adapted to change between said first and second levels at a predetermined period, said transfer means being adapted to transfer the charges in response to a change between said first and second levels of said drive signal, and said transfer means receiving the charges from said photoelectric transducer means through said shift means when said drive signal has said first level;
    (e) generating means for generating a shift signal irrespective of said drive signal, said shift signal causing said shift means to shift the charges from said plurality of elements to said transfer means; and
    (f) control means responsive to said shift signal to control said driving means so that said drive signal has said first level for a first period of time following the generation of said shift signal, said control means causing said driving means to change the level of said drive signal to said second level at the termination of said first period of time and thereafter to hold said drive signal at said second level for a second period of time, the sum of said first period of time and said second period of time being not less than a predetermined time interval which is substantially half of said predetermined period, and said second period of time being substantially equal to said predetermined time interval.

2. An apparatus according to claim 1, wherein said driving means has gate means for outputting said drive signal and said control means controls said gate means.

3. An apparatus for generating a signal corresponding to a light intensity distribution, comprising:
   (a) photoelectric transducer means having a plurality of elements which respectively generate charges corresponding to light intensities;
   (b) transfer means for time-serially transferring the charges to an output of said apparatus;
   (c) shift means for shifting the charges from said plurality of elements to said transfer means;
   (d) driving means for driving said transfer means, said driving means being adapted to supply a drive signal to said transfer means so as to drive said transfer means, said drive signal having a first level and a second level different from said first level and being adapted to change between said first and second levels at a predetermined period, and said transfer means being adapted to transfer the charges in response to a change between said first and second levels of said drive signal, said transfer means receiving the charges from said photoelectric transducer means through said shift means when said drive signal has said first level;
   (e) generating means for generating a shift signal irrespective of said drive signal, said shift signal causing said shift means to shift the charges from said plurality of elements to said transfer means; and
   (f) control means responsive to said shift signal to control said driving means so that said drive signal has said first level for a first period of time following the generation of said shift signal, and so that said drive signal has said second level for a second period of time at the termination of said first period of time, the sum of said first and second periods of time being not less than a predetermined time interval which is substantially half of said predetermined period.

4. An apparatus according to claim 3, wherein said second period of time is substantially equal to said predetermined time interval.

5. An apparatus according to claim 3, wherein said control means adds said shift signal to said drive signal.

6. An apparatus according to claim 3, wherein said shift signal is a pulse having a pulse width which is substantially half of said predetermined period.

7. An apparatus according to claim 3, wherein said control means, when the level of said drive signal is said second level, causes said driving means to change the level of said drive signal from said second level to said first level in response to said shift signal.

8. An apparatus according to claim 3, wherein said control means, when the level of said drive signal is said first level, causes said driving means to hold the level of said drive signal at said first level in response to said shift signal.

9. An apparatus according to claim 3, wherein said control means includes means for generating a reference signal which changes between two different levels at said predetermined period and producing means for producing said drive signal in response to said reference signal.

10. An apparatus according to claim 3, which further comprises receiving means provided with a light-receiving surface and means for detecting that the amount of incident light on said light-receiving surface has reached a predetermined value and therefore producing a detection signal.

11. An apparatus according to claim 10, wherein said generating means generates said shift signal in response to said detection signal.

12. An apparatus according to claim 3, wherein said driving means has gate means for outputting said drive signal and said control means controls said gate means.

* * * * *